March 21, 1933. W. B. SLEMMER 1,902,145
APPARATUS DESIGNED FOR HANDLING CEMENT AND LIKE MATERIAL
Filed Oct. 21, 1931
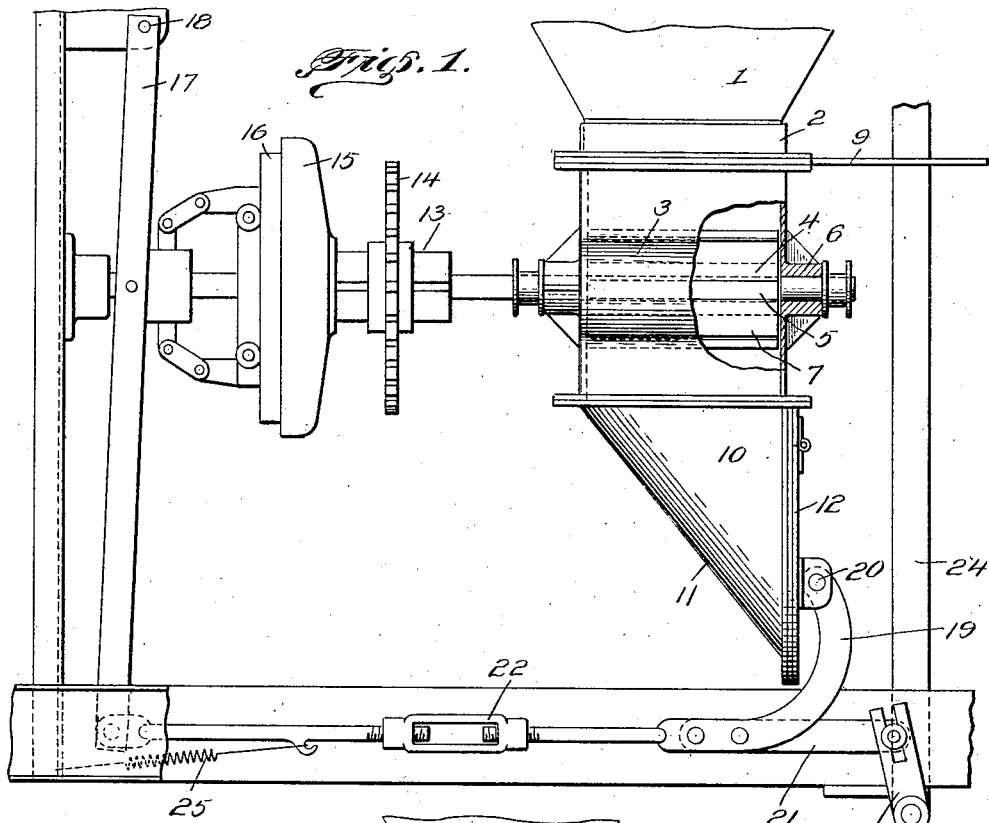
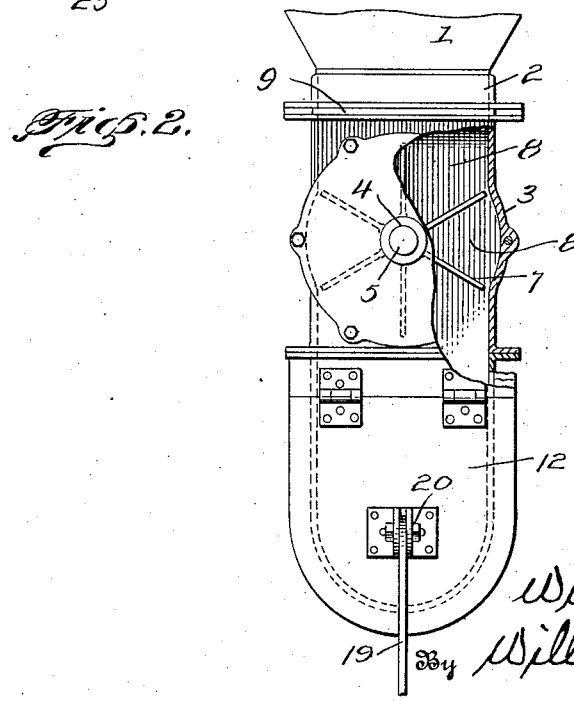
Inventor
William B. Slemmer,
By William D. Deane
his Attorney Patented Mar. 21, 1933

1,902,145

UNITED STATES PATENT OFFICE

WILLIAM B. SLEMMER, OF MALDEN, MASSACHUSETTS, ASSIGNOR TO WARREN BROTHERS COMPANY, OF CAMBRIDGE, MASSACHUSETTS, A CORPORATION OF WEST VIRGINIA

APPARATUS DESIGNED FOR HANDLING CEMENT AND LIKE MATERIAL

Application filed October 21, 1931. Serial No. 570,251.

This invention is directed to an apparatus designed for handling finely-divided material, as cement and like materials, and particularly for controlling the delivery of the material, delivered from a source of supply, to a weighing machine, while absolutely preventing any overrun of the material.

In apparatus of this type particularly when used in proportioning cement in load values, it has been found difficult to accurately control the cement delivery, incident to the liability of the cement, especially when aerated, to flow or dribble after feeding cut off, this obvious disadvantage resulting in improper proportioning, to say nothing of loss of material.

In a copending application there is described an apparatus for controlling the feeding to prevent overrun, such apparatus involving the use of a longitudinally-acting conveyor for delivery of the material. The present invention aims to dispense with such longitudinal or other type of moving conveyor, and to provide for gravital delivery of the material.

The primary object of the present invention is to provide for intermittent feeding of the material immediately beyond the delivery from the source of supply, and to deliver such material by gravity to the weighing machine, with means for cutting off such gravital delivery and at the same time interrupting the intermittent feeding.

The invention further provides for the simultaneous control of the intermittent feeding and delivery cut off, to insure that with the delivery cut off, no further feeding can take place, the delivery cut off being arranged to positively seal the outlet against any delivery, thus avoiding the possibility of overrun or dribble of the material, and insuring accurate proportioning and preventing loss incident to overrun.

The invention is illustrated in the accompanying drawing, in which:—

Fig. 1 is a view in side elevation, partly in section, of the improved apparatus.

Fig. 2 is an end view, partly broken away, of the same.

The improved apparatus includes a bulk hopper 1, to which the material is delivered in any conventional or desired manner. The bulk hopper here shown is indicative of any means for delivering the material to the feeder, and the use of the term hopper herein is intended to mean any bulk delivering means.

Extending below and in open communication with the hopper 1, is a flange 2, to which, at an appropriate distance from the hopper, is secured a feeder casing 3. A feeder is arranged for operation within the casing 3, this feeder 4 including a shaft 5, rotatably mounted in bearing enlargements 6 of the end walls of the casing. The feeder proper is made up of wings 7, radiating from the shaft 5 within the casing 3, the wings forming a series of feeder pockets 8, which, in the rotation of the feeder, are successively presented to receive material from the source of supply, as for example, the hopper 1. The hopper delivery, or other source of supply delivery, is directly controlled by the usual or any conventional gate, as 9, or any similar means, preferably arranged for manual operation.

Arranged below and in open communication with the lower end of the feeder extension flange is a delivery chute 10, having a delivery outlet. The wall 11 opposite the delivery outlet inclines downwardly toward the delivery outlet, to thereby direct the material through such outlet by gravity. The delivery chute at the upper end is of sufficient dimensions to receive a full feeding delivery from the pockets 8, and to direct such delivery toward the delivery outlet of the chute with complete freedom of flow.

The delivery from the chute 10 is controlled by a cut-off in the form of a gate 12, preferably hingedly mounted at its upper end to the wall of the chute at the delivery end of the chute. The gate is of sufficient size to completely cut off delivery from the chute when the gate is closed, and permit full capacity delivery from the chute when the gate is open. The inner or chute-engaging face of the gate may be, and preferably is, provided with a sealing gasket to effectively seal the edges of the chute delivery opening, for positively preventing overrun when the gate is closed.

The material is intermittently delivered from the feeder to the chute, that is each pocket of the feeder receives its load from the bulk source, and delivers such load to the chute, and while this delivery is, in effect, almost continuous, it is nevertheless truly intermittent, and may obviously be controlled in this particular by the speed of rotation of the feeder shaft 5. The purpose here is to prevent a continuous mass flow from the source of supply, or hopper, as shown, to the delivery chute, and to cut off flow to the chute by interruption of the operation of the feeder.

It is of course important that when the gate of the chute is closed the feeder should be stopped, and that when the feeder is operating the gate should be open. This virtually requires a control which will synchronize the gate and feeder movements, and such is an important feature of the present invention.

The feeder shaft 5 is extended in one direction and carries a power element in the form of a sleeve 13, loose on the shaft and having a driving means, as a belt wheel, sprocket, or gear 14, operated from any suitable power source. The sleeve carries a clutch element 15, a cooperating clutch element 16 being keyed for sliding movement on the shaft 5, and operated relative to the clutch element 15 by a lever 17, pivoted at 18 to the frame of the apparatus.

The gate 12 is included in the control means, through an arm 19, swingingly connected to the gate at 20, and curved to extend below the chute, where it is connected to a longitudinally-movable rod 21. The rod 21 is made up in part of sections connected by a turnbuckle 22, providing for adjustment to compensate for wear. One end of the rod 21 is connected to the lower end of the clutch lever 17, and the opposite end, which is extended beyond the arm connection, is shown as operatively connected through a crank 23, with a hand lever 24. A spring 25, anchored to the frame is connected to the rod 21, acting to pull the rod in a direction to close the gate 12.

Obviously the movement of the hand lever 24 controls the operation of the feeder 4 and gate 12, the former through the clutch and the latter directly through the rod 21. Thus when the gate is closed, the clutch elements are separated and the feeder is stopped, while when the gate is opened, the clutch elements are moved into cooperation, and the shaft 5, and thereby the feeder 4. is operated. Thus the feeder and gate are synchronized in operation and material feeding effect. When the gate is closed all possible overrun or dribble of the material is positively cut off, and at the same time the feeder interrupts material delivery to the chute.

The indication of the control element as a hand lever 24, is intended to represent any desired or preferred means of control or operation. For example, as is conventional in similar types of apparatus, the control may be automatic and electrically governed by the weighing machine. The hand lever 24 represents any and all such controls as are or may be conventionally used or known.

Of course the apparatus, while more particularly designed for the handling of cement, is well adapted for use with any finely-divided material for any and all purposes, and any and all such uses are contemplated.

Having thus described the invention, what is claimed as new, is:—

A material handling apparatus comprising a feeder embodying a plurality of radially arranged uniformly spaced wings of which each pair of adjacent wings defines a receiving pocket, a casing enclosing said feeder and in communication at its top with a source of supply, a chute with which said casing is in communication through its bottom, a swinging closure closing the chute on one side, the chute having an inclined bottom wall, a shaft rotatably mounted in said casing and carrying said feeder, a clutch control power actuated member on said shaft, and means for simultaneously opening said closure and engaging said clutch.

In testimony whereof I affix my signature.

WILLIAM B. SLEMMER.